J. ALLENDER, dec'd.
T. ALLENDER, Exc't'r.
Wringing-Machine.
No. 6,288. Reissued Feb. 9, 1875.
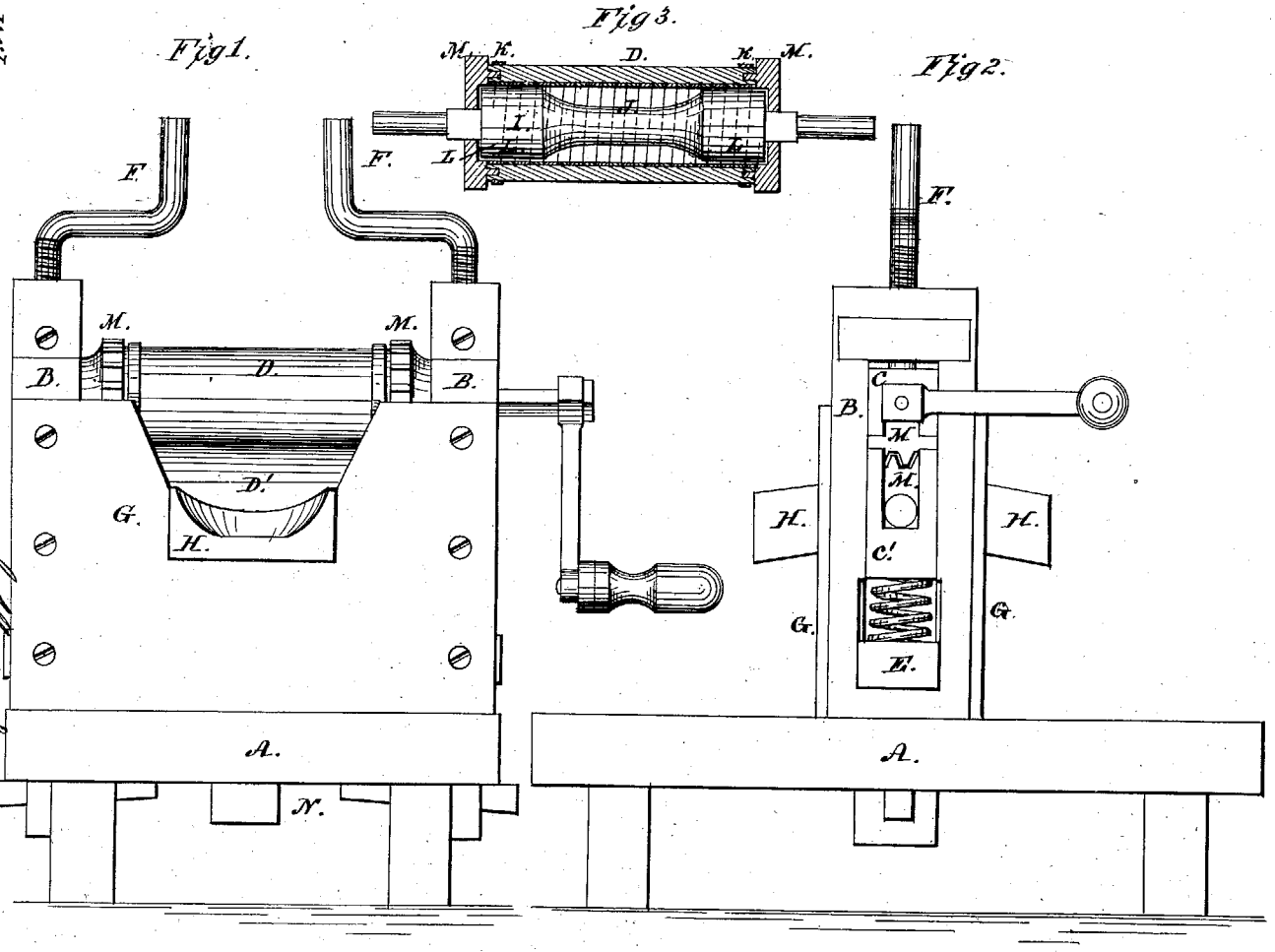
Witnesses:
Chas. J. Cook
A. L. Mayo
J. Allender Dec'd
T. Allender Exc'r
Bailey Washing & Wringing
Machine Company Assignees
Per Somes & Co. Attorneys

UNITED STATES PATENT OFFICE.

BAILEY WASHING AND WRINGING MACHINE COMPANY, OF WOONSOCKET, RHODE ISLAND, ASSIGNEE, BY MESNE ASSIGNMENTS, OF THOMAS ALLENDER, (EXECUTOR OF JOHN ALLENDER, DECEASED.)

IMPROVEMENT IN WRINGING-MACHINES.

Specification forming part of Letters Patent No. 22,539, dated January 11, 1859; reissue No. 1,709, dated June 28, 1864; reissue No. 1,807, dated November 8, 1864; reissue No. 1,934, dated April 18, 1865; extended seven years; reissue No. 6,288, dated February 9, 1875; application filed December 2[illegible], 1874.

DIVISION A.

*To all whom it may concern:*

Be it known that JOHN ALLENDER, deceased, late of New London, New London county, State of Connecticut, invented a new and Improved Machine for Wringing Clothes, of which the following is a specification sufficiently full, clear, and exact to enable others skilled in the art to which the invention appertains to make and use the same, reference being had to the annexed drawings forming a part hereof, in which the same letters indicate like parts in each of the figures.

Figure 1 is a front elevation of a pair of squeezers with said new rollers. Fig. 2 is a side elevation of the same. Fig. 3 is a section of one of said rollers.

The nature of said invention consists in a roller made of a spirally coiled spring arranged on a shaft or roller made smallest in the middle, to allow the spring to yield, which spring is covered with india-rubber, or some flexible material, that will yield or bend readily to the cloth, clothes, or other articles being squeezed by the rollers.

In the accompanying drawings, A is the base of the frame of the squeezing-rollers, to which the standards B B are fastened. In each of these standards there is a long slot, in which the boxes C of the top roller D and the boxes C′ of the bottom roller D′ are fitted to traverse, the boxes C′ being pressed upward by the spiral spring E, placed between the bottom of the slot and the box, as shown in Fig. 2. The screws F F act against the top boxes C, to press the rollers together, and press them down, and press the boxes C′ against the spring E, to produce the required pressure between the rollers for the cloth or clothes to be squeezed. The standards B B are boarded upon each side of the rollers, as shown in Fig. 1, at G, and a guide, H, is fastened to the boarding G, to guide the cloth or clothes between the rollers. The rollers D D′ consist of a shaft or central roller, I, made smaller in the middle, as shown in Fig. 3. This shaft is surrounded by a flat metal spring coiled spirally, so as to form a cylinder, J, of uniform diameter from end to end, as shown in section, Fig. 3. Around this spring-cylinder J there is a cylindrical covering, D, made of india-rubber, or some flexible material, that will yield or bend readily as the spring-cylinder inside of it yields to the pressure of the cloth or clothes passing between the rollers. This india-rubber covering is surrounded with a thin hoop, K, at each end and is pierced by several spurs, L L, on the gears M M, which are firmly fastened to the shaft I, to make both the rollers turn together as the cloth or clothes being squeezed passes between them, and the water squeezed from the cloth runs from the under roller between the boards G G, onto the base A, and, through the spout N, away from the machine.

The central roller, I, being made smaller in the middle, allows the coiled-spring cylinder to yield to the varying thickness of the cloth or clothes passing between the roller.

What is claimed as the invention is—

1. A roller made of a spirally-coiled spring, arranged on a shaft or roller made smaller at the center than at the ends, as and for the purposes specified.

2. A roller yielding more at its center than at or near its ends, covered with vulcanized rubber, or any other elastic compounds impervious to water.

3. Cog-wheels, in combination with rollers of vulcanized rubber, or any other elastic substance or compound impervious to water, for the purpose set forth.

4. Rollers made of or covered with vulcanized rubber, or any other elastic substance or compound impervious to water, in combination with cog-wheels and a spring or springs around the shaft of the roller, for the purpose set forth.

5. Rollers for washing or wringing machines, made of or covered with vulcanized rubber, or any other elastic substance or compound impervious to water, in combination with adjusting spring or springs.

6. Rollers for washing or wringing machines, made of or covered with vulcanized rubber, or any other elastic substance or compound impervious to water, in combination with adjusting spring or springs and screw or screws, to adjust the pressure to the springs and rollers.

7. The guide or guides, in combination with the squeezing-rollers, made of or covered with vulcanized rubber, or other elastic material impervious to water.

8. Rollers made of or covered with vulcanized rubber, or other elastic material impervious to water, in combination with cog-wheels and a guide or guides, substantially as described.

BAILEY WASHING AND WRINGING MACHINE CO.,
By S. A. BAILEY, *Gen. Agt.*

Witnesses:
D. E. SOMES,
FRANK CHASE SOMES.